(12) United States Patent
Fulton

(10) Patent No.: US 11,871,727 B2
(45) Date of Patent: Jan. 16, 2024

(54) ANIMAL LEASH AND ACCESSORIES

(71) Applicant: Paul Fulton, Los Gatos, CA (US)

(72) Inventor: Paul Fulton, Los Gatos, CA (US)

( * ) Notice: Subject to any disclaimer, the term of this patent is extended or adjusted under 35 U.S.C. 154(b) by 180 days.

(21) Appl. No.: 17/483,400

(22) Filed: Sep. 23, 2021

(65) Prior Publication Data
US 2023/0093275 A1 Mar. 23, 2023

(51) Int. Cl.
*A01K 27/00* (2006.01)

(52) U.S. Cl.
CPC .......... *A01K 27/003* (2013.01); *A01K 27/005* (2013.01); *A01K 27/008* (2013.01)

(58) Field of Classification Search
CPC .. A01K 27/003; A01K 27/005; A01K 27/001; A01K 27/00; A01K 27/008
See application file for complete search history.

(56) References Cited

U.S. PATENT DOCUMENTS

| | | | | |
|---|---|---|---|---|
| 5,351,654 | A * | 10/1994 | Fuentes | A01K 27/00 D30/153 |
| 6,085,695 | A * | 7/2000 | Miller | A01K 27/006 224/604 |
| 6,619,238 | B1 * | 9/2003 | Amato | A01K 27/005 119/797 |
| 2006/0032515 | A1 * | 2/2006 | Thall | A45D 8/40 132/274 |
| 2010/0288207 | A1 * | 11/2010 | Hollenbeck | A01K 27/003 119/797 |
| 2014/0366813 | A1 * | 12/2014 | Condit | A01K 27/003 119/795 |
| 2015/0020753 | A1 * | 1/2015 | Gracia | A01K 27/003 119/797 |
| 2016/0050887 | A1 * | 2/2016 | Polcyn | A01K 27/003 119/797 |
| 2017/0064928 | A1 * | 3/2017 | Seuk | A01K 27/001 |
| 2018/0359997 | A1 * | 12/2018 | Hogg | A01K 27/003 |

OTHER PUBLICATIONS

Ruffwear.com [online], "Knot-a-Hitch: campsite dog-hitching system," Jan. 1, 2020, retrieved on Sep. 24, 2021, retrieved from URL <https://ruffwear.com/collections/dog-leashes/products/knot-a-hitch>, 9 pages.
Ruffwear.com [online], "Knot-a-Long Rope Dog Leash reflective rope, locking carabineer" Feb. 8, 2021, retrieved on Sep. 24, 2021, retrieved from URL <https://ruffwear.com/collections/dog-leashes/products/knot-a-long-short-rope-dog-leash>, 8 pages.

* cited by examiner

Primary Examiner — Kristen C Hayes
(74) Attorney, Agent, or Firm — Fish & Richardson P.C.

(57) ABSTRACT

The disclosure describes an animal leash that includes a strap including first and second strap portions stacked one over the other, the strap having a first end and a second end. The leash includes a first coupling link attached to the first end of the strap, and a second coupling link attached to the second end of the strap. Along a middle section of the strap, the first and second strap portions form loops. The first coupling link is operable for attachment to any one of the loops. The disclosure also describes a storage attachment for use with an animal leash.

16 Claims, 5 Drawing Sheets

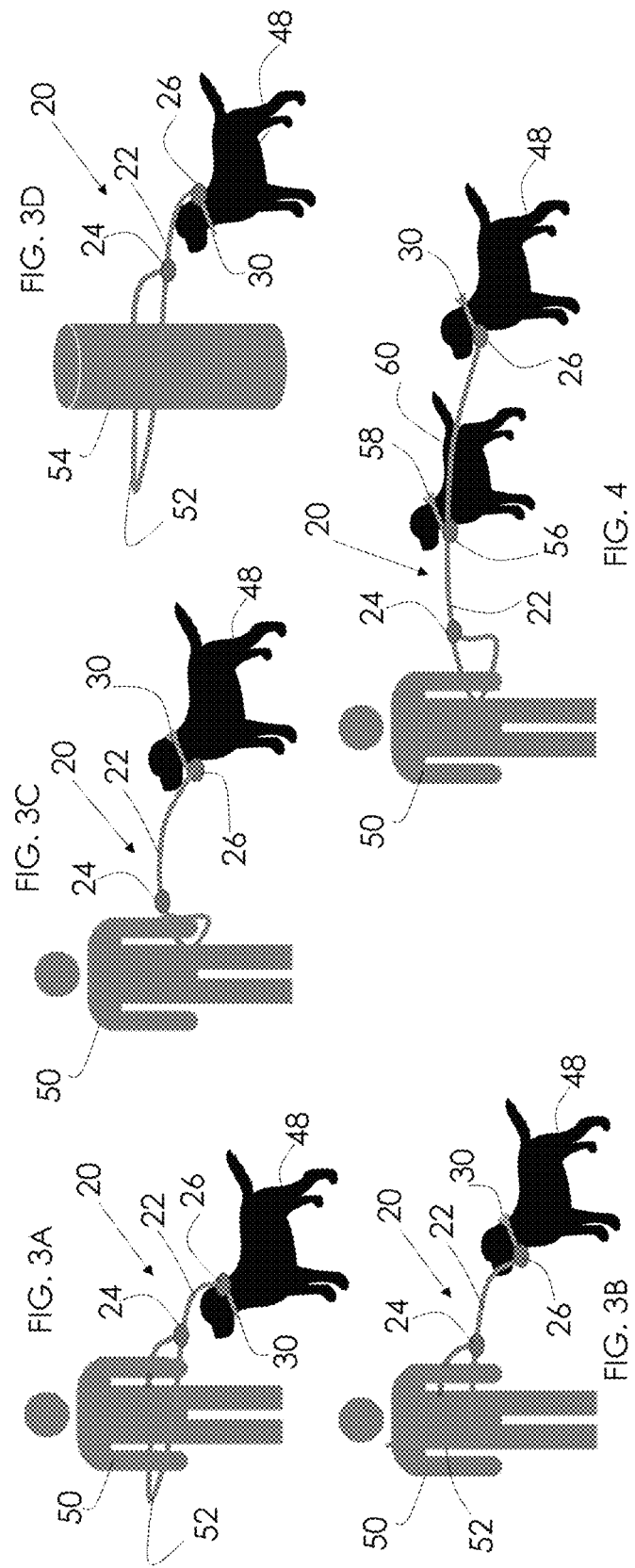

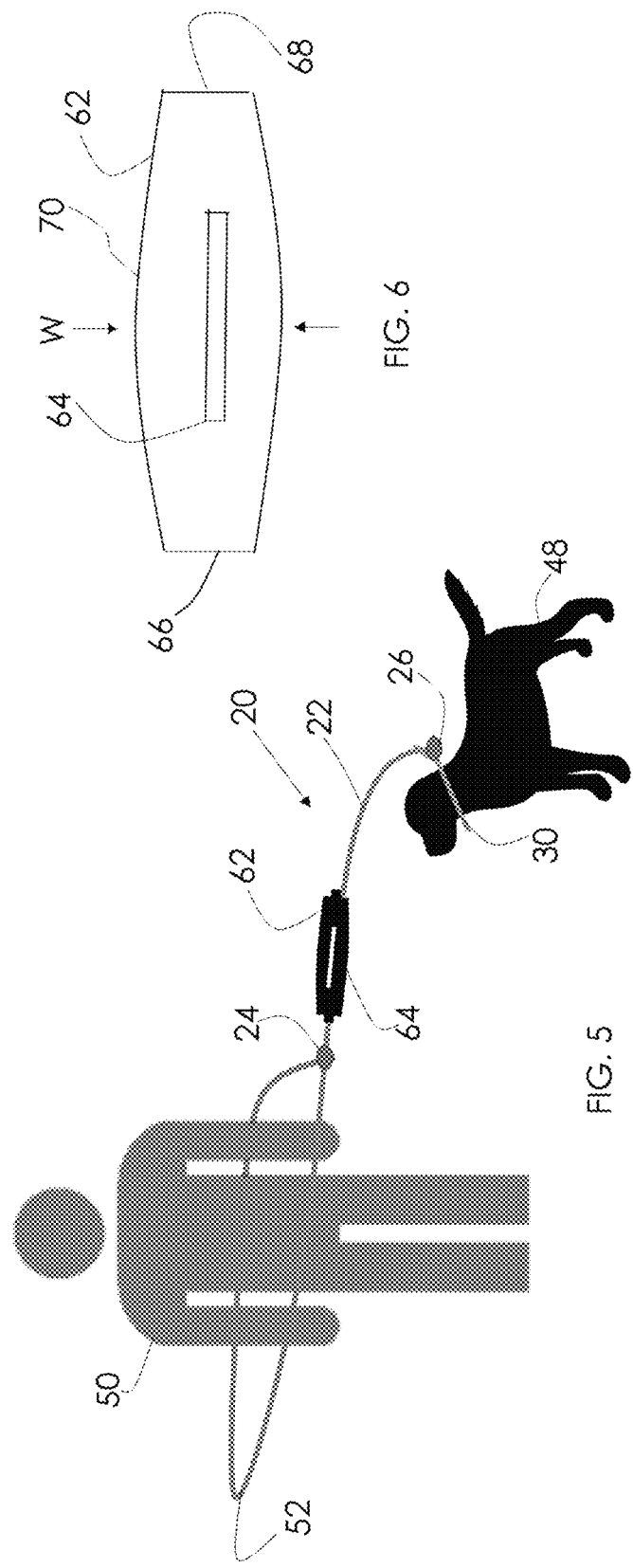

– 1 –

ANIMAL LEASH AND ACCESSORIES

FIELD OF THE DISCLOSURE

The present disclosure relates to leashes for animals, and accessories for the leashes.

BACKGROUND

Dogs serve as common household pets, and in some cases, can help individuals improve their health and wellness (e.g., by reducing depression or easing loneliness). Dogs also are used by police (e.g., to search for illegal substances) and search and rescue teams. In some instances, dogs are trained to perform tasks for an individual with a disability. Seeing-eye dogs, for example, can look out for hazards and obstacles that a blind person cannot detect.

In many instances, the dog is held by a leash attached, for example, to the dog's collar, harness, or halter. The leash can facilitate controlling the dog, for example, to prevent the dog from trespassing on a neighbor's property during a walk, to protect the dog from running into the street or chasing squirrels or other wildlife, or from getting too close to other people or unrestrained animals. In many jurisdictions, local laws require that dogs be kept on a leash when on public property so as to protect the health and safety of the public, as well as the dog.

Some commercially available leashes are designed for casual dog walker use and are not designed for rigorous physical activity. Further, some leashes use components that are prone to fail, difficult to use, and are not easily configurable.

SUMMARY

The present disclosure describes leashes for animals (e.g., dogs), as well as accessories for the leashes.

In one aspect, for example, an animal leash includes a strap including first and second strap portions stacked one over the other, the strap having a first end and a second end. The leash includes a first coupling link attached to the first end of the strap, and a second coupling link attached to the second end of the strap. Along a middle section of the strap, the first and second strap portions form loops. The first coupling link is operable for attachment to any one of the loops.

Some implementations include one or of the following features. For example, in some cases, the first and second strap portions are attached to one another by bar tack stitches along a width of the first and second strap portions. In some implementations, the second strap portion is pinched together at points midway between adjacent pairs of the bar tack stitches. In some instances, the second strap portion is pinched together at points midway between adjacent pairs of the bar tack stitches by additional bar tack stitches.

In some implementations, each of the first and second coupling links includes a respective carabiner, and each of the carabiners is attached at a respective end of the strap between respective pairs of the bar tack stiches. In some cases, the respective pairs of bar tack stitches between which the carabiners are attached prevent significant rotation of the carabiners relative to the strap.

In some implementations, each of the first and second coupling links includes a respective safety closure. Each of the first and second coupling links can include, for example, a respective carabiner. In some instances, the first coupling link is attached to one of the plurality of loops along the middle section of the strap so as to form a ring.

In some implementations, the first and second strap portions comprise nylon. In some instances, the strap further includes a stretchable elastic section adjacent the first end of the strap.

In some implementations, the leash includes a storage compartment disposed around a section of the strap, the storage compartment having openings at opposite ends through which the strap extends, the storage compartment further having a slot for insertion or removal of an object. In some cases, the storage compartment is composed of a four-way stretch neoprene material. In some instances, the storage compartment is wider at a middle section than at the ends.

In some implementations, the leash is a dog leash that includes a strap including first and second strap portions attached in parallel one over the other. The strap has a first end and a second end, wherein the first and second strap portions are attached to one another by sets of stitches each of which runs along a width of the first and second strap portions. Different sets of the stitches are separated from one another along a length direction of the first and second strap portions so as to form loops along the strap. The leash can include a first carabiner connected to the first end of the strap and configured for connection to any one of the loops. A second carabiner can be connected to the second end of the strap.

The disclosure also describes a storage attachment for use with an animal leash. The storage attachment includes a compartment having a respective opening at each of its opposite ends, the openings being sized for a strap of an animal leash to pass through. The compartment further has a slot substantially perpendicular to the openings, the slot being configured for insertion or removal of an object, wherein the compartment is wider at a middle section than at the ends.

In some implementations, the compartment is composed of a four-way stretch neoprene material. In some instances, the compartment has a length in a range of 4-6 inches and a width in a range of 0.5-1 inch. Different dimensions or materials may be used in some implementations.

Some implementations include one or more of the following advantages. For example, in for various implementations, the leash can be used by a wide range of dog handlers, including service dog handlers, police dog handlers, search and rescue dog handlers, health and wellness dog handlers, and others. In some implementations, the leash is composed of high-grade components and has a robust design such that it can sustain highly physical conditions, provide high reliability, and/or offer in-field configurability. In some implementations, the leash allows for hands-free connection of the dog to the handler's waist, to the handler's body off the shoulder, or to objects for hitching quickly with minimal effort. In some instances, multiple dogs may be attached to the leash. In some cases, configurable elastic sections provide for animal pull shock control and also provide for secure elastic attachment to the handler.

Although particular examples are described in connection with a leash for dogs, the leashes described here also may be used for other animals.

The disclosure also describes a storage attachment for use with an animal leash. The storage attachment includes a compartment having a respective opening at each of its opposite ends, the openings being sized for a strap of an animal leash to pass through. The compartment further has a slot substantially perpendicular to the openings, the slot being configured for insertion or removal of an object, wherein the compartment is wider at a middle section than at the ends. In some implementations, the container is composed of a four-way stretch neoprene material and may have a length in the range of 4-6 inches and a width in the range of 0.5-1 inch. In some implementations, the storage attachment allows for low-bounce, secure, and reliable attachment of personal items or doggie bags.

The details of one or more implementations are set forth in the accompanying drawings and the description below. Other aspects, features and advantages will be apparent from the following detailed description, the accompanying drawings, and the claims.

BRIEF DESCRIPTION OF THE DRAWINGS

FIGS. 3A, 3B, 3C and 3D illustrate examples of configurations and uses of the leash.

FIG. 4 illustrates another configuration of the leash for use with multiple animals.

FIG. 5 illustrates an example of the leash including a storage compartment.

FIG. 6 illustrates further details of the storage compartment in some implementations.

DETAILED DESCRIPTION

The present disclosure describes a leash that can be used in various different configurations depending on the needs of the handler. The leash can include at least one carabiner or other coupling link with a safety closure. For example, in some instances, a first coupling link (e.g., a first carabiner) is attached at a first end of the leash, and a second coupling link (e.g., a second carabiner) is attached at a second end of the leash. In use, one of the carabiners can be attached, for example, to the collar, harness, or halter of a dog or other animal. The carabiner at the other end of the leash can be attached, for example, to any one of multiple loops along a middle section of the leash so as to form a ring that can be worn, for example, about the handler's body or placed around a pole or other object. In some cases, a further coupling link (e.g., a third carabiner) can be attached to another one of the loops along the leash. The third carabiner can be attached to the collar, harness, or halter of a second dog or other animal to allow two (or more) animals to be attached to the leash at the same time.

Figure 1:
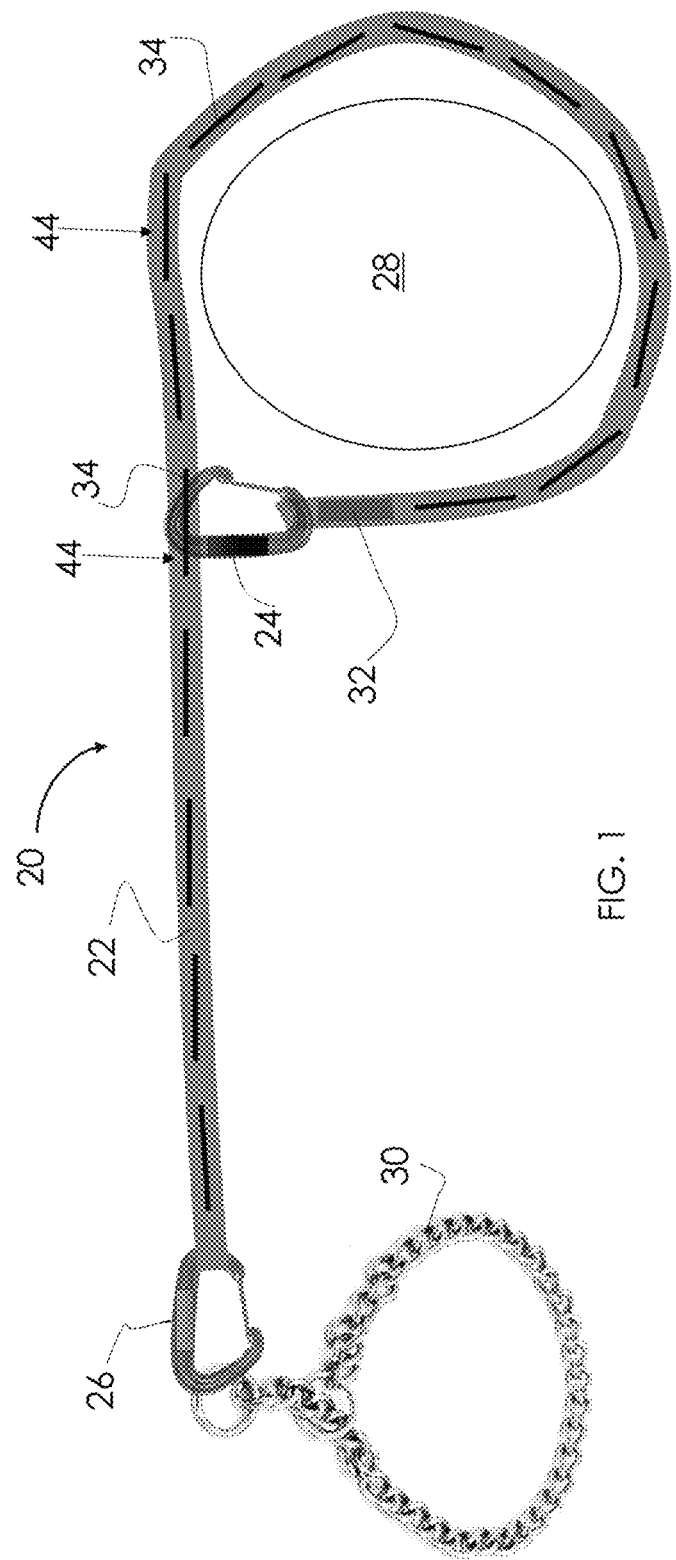
FIG. 1 illustrates an example of a leash.

As shown in the example of FIG. 1, a leash 20 includes a main strap 22. A first coupling link 24 is attached at a first end of the main strap 22, and a second coupling link 26 is attached at a second end of the main strap 22. In some instances, the coupling links 24, 26 are sewn in at the opposite ends of the strap 22. Each of the coupling links 24, 26 can include a respective safety closure. In some instances, the first coupling link 24 is implemented as a first carabiner, and the second coupling link 26 is implemented as a second carabiner. Each of the carabiners can be, for example, a D-shaped or oblong metal (e.g., aluminum) ring with a spring-hinged side that is used as a connector. In some instances, climbing grade aluminum carabiners having at least a 20 kN (kilonewtons) longitudinal major axis breaking force can be used.

Figure 2A:
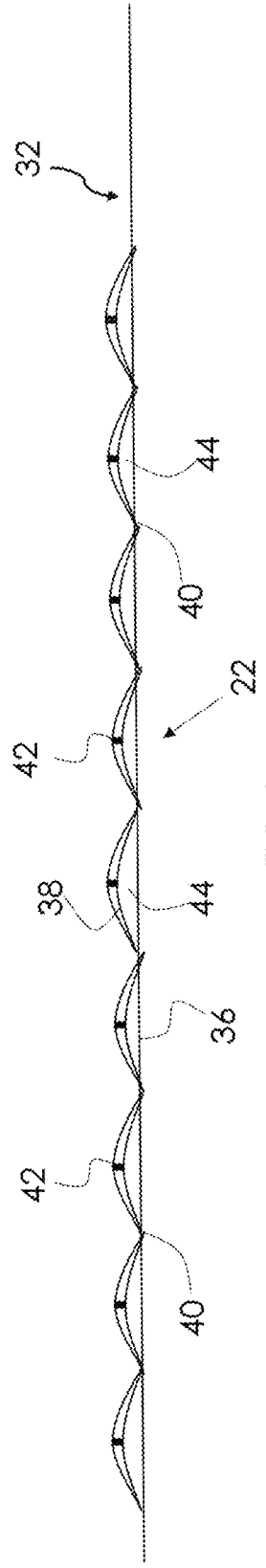
FIGS. 2A and 2B illustrate an example of a strap for the leash.
Figure 2B:
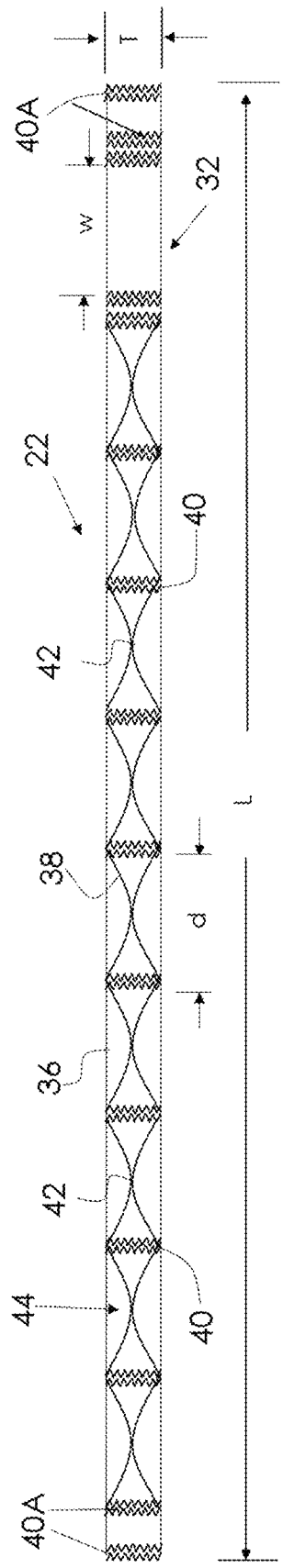

As shown in FIGS. 2A and 2B, in some implementations the main strap 22 includes a lower (or first) strap portion 36 and an upper (or second) strap portion 38 stacked one over the other in parallel. In some implementations, the first and second strap portions 36, 38 are composed, for example, of nylon, which tends to have good abrasion and wear resistance, high tensile and compressive strength, relatively low weight, and can be machined relatively easily. The strap portions 36, 38 can be composed, for example, of military grade rip-stop reinforced nylon straps having at least a 20 kN breaking force and are resistant to breaking and to dog chewing. The first and second strap portions 36, 38 can be attached to one another, for example, by bar tack stitches 40 across their width. In some instances, the bar tack stitches 40 are separated from one another along the length of the main strap 22 at a fixed distance d, for example, of four inches.

Regions of the strap 22 between pairs of adjacent stitches 40 form respective loops 44. To facilitate connecting one of the coupling links (e.g., the first carabiner 24) to one of the loops 44, as shown in FIG. 1, the upper strap portion 38 can be pinched together at points 42 approximately midway between adjacent pairs of the bar tack stitches 40 (see FIGS. 2A and 2B). Pinching together of the upper strap portion 38 can be accomplished, for example, using bar tack stitches, which can result in the strap portion 38 being raised slightly (e.g., at points 42) so that the carabiner 24 can be attached relatively easily without having to separate the top and bottom strap portions from one another. In some cases, such an arrangement can facilitate single-hand, simple, and secure attachment, and removal of the carabiner 24 to and from the middle section of the strap 22.

Near the ends of the main strap 22, the first and second strap portions 36, 38 can be attached to one another by bar tack stitches 40A that are positioned even closer together than the dimension d. The close stitching can help constrain the carabiners (or other coupling links) 24, 26 attached to the ends of the main strap 22 so as to prevent or reduce rotation of the carabiners relative to the main strap. In some implementations, at least one end of the main strap 22 includes an elastic stretchable section 32 composed, for example, of 70% nylon and 30% lycra. In the illustrated example, the elastic stretchable section 32 is at the end of the main strap 22 adjacent to where the first carabiner 24 is attached. The elastic stretchable section 32 can have a width w, which in some cases is about four inches. In the illustrated example, the overall length L of the main strap 22 is about four to eight feet, and its thickness is in the range of half an inch to an inch.

Dimensions and/or materials different from those discussed above may be used for some implementations.

As further shown in FIG. 1, in use, one of the carabiners (e.g., the second carabiner 26) can be attached, for example, to the collar, harness, or halter 30 of a dog or other animal. The carabiner at the other end of the main strap 22 (e.g., the first carabiner 24) can be attached, for example, to any one of the multiple loops 44 along the middle section of the main strap 22 so as to form a ring that can be worn, for example, about the handler's body 28 (e.g., about the handler's waist, shoulder or wrist), or placed around a pole or other object. That is, the leash can be used in various different configurations depending on the needs of the handler. Further, the size of the ring can be adjusted (e.g., made larger or smaller) by connecting the first carabiner 24 to a different one of the loops 44.

FIG. 3A illustrates an example in which the second carabiner 26 at one end of the leash 20 is attached to the collar, harness, or halter 30 of a dog 48. The carabiner 24 at the other end of the leash 20 is attached to one of the loops (e.g., loops 44 shown in FIGS. 2A and 2B) along the middle section of the main strap 22 so that a portion of the strap forms a ring 52 about the handler 50. In some cases, the ring 52 can be made smaller so as to be fit snuggly about the handler's body (e.g., waist), which in some instances may permit hands-free connection of the dog 48 to the handler. In some cases, the length adjustments are made with a climbing-grade carabiner that attaches securely to the nylon strap 22. Such attachments can avoid or reduce slip that sometimes occurs with friction-type adjustments.

FIG. 3B illustrates an example in which the ring 52 formed by the strap 22 of the leash 20 is draped over the handler's shoulder and around his or her torso. Here as well, this configuration may permit, in some instances, hands-free connection of the dog 48 to the handler. FIG. 3C illustrates an example in which the ring 52 formed by the strap 22 of the leash 20 is made relatively small (e.g., by connecting the carabiner 24 to one of the loops 44 that is close to the end of the strap 22 near the carabiner 24) so that the handler 50 can hold the ring 52 in his or her hand or wear it about his or her wrist. In some instances, instead of the handler wearing the ring 52 formed by the strap 22 about his or her body, the ring 52 formed by the strap 22 can be placed about a pole 54 or other object, as illustrated in the example of FIG. 3D. The leash 20 thus facilitates hitching the dog or other animal to a pole or other object without having to remove the dog from the leash. Here as well, the size of the ring 52 can be adjusted (e.g., made larger or smaller) by connecting the first carabiner 24 to a different one of the loops along the middle section of the strap 22.

The handler can change the configuration of the leash to accommodate any of the scenarios of FIGS. 3A-3D in a relatively simple, quick and easy manner. Further, the effective length of the leash 20 can be adjusted relatively quickly and securely by connecting the carabiner 24 to an appropriate one of the loops 44.

In some cases, as illustrated in FIG. 4, a further coupling link (e.g., a third carabiner) 56 can be attached to one of the loops (e.g., loops 44 in FIGS. 2A and 2B) along the middle section of the main strap 22. The third carabiner 56 also can be attached to the collar, harness, or halter 58 of a second dog 60 or other animal to allow two (or more) animals to be attached to the leash at the same time.

Figure 7:
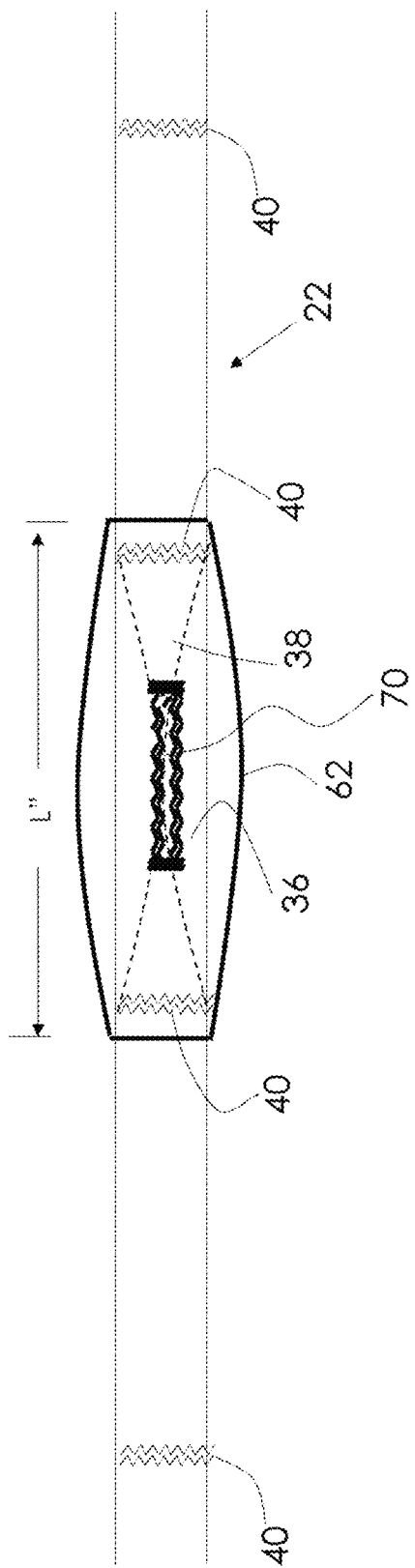
FIG. 7 illustrates further details of the storage compartment in place on the strap of the leash.

In some implementations, as shown in the example of FIGS. 5, 6 and 7 the leash 20 includes a storage attachment 62 that can be placed onto the main strap 22. The storage attachment 62 can include, for example, a four-way stretch elastic fabric sewn in a tube formation with the ends being sewn such that they are substantially flat and are flush with the main strap 22 when installed leash. In some instances, the storage attachment 62 is composed of four-way stretch neoprene material. In the center of the storage attachment 62, a small slot 64 can be sewn to allow the insertion and removal of small items such as canine excrement bags (i.e., "doggie" bags), keys or cards. The interior space of the storage attachment 62 thus can serve as a storage compartment. The back side of the storage compartment 62 can include a stitched closure. In some implementations, the storage attachment 62 is configured such that the loaded attachment does not bounce significantly when the strap 22 bounces during use of the leash.

As shown in FIG. 6, opposite ends 66, 68 of the storage attachment 62 can have small openings that allow the strap 22 to slide through the openings so that the storage attachment 62 can be placed at a desired position along the strap. The openings at the ends 66, 68 of the storage attachment 62 preferably are sized such that the openings fit reasonably tightly around the strap 22. For example, in some cases, the openings at the ends 66, 68 of the storage attachment 62 are approximately ½ inch. In some implementations, the length (L") of the storage attachment 62 is slightly larger than the distance between adjacent pairs of the bar tacks 40. For example, in some cases, the length L" of the storage attachment 62 is in the range of 4-6 inches (e.g., 4.5 inches). The width (W) at the middle section 70 of the storage attachment 62 can be slightly larger than the width at the ends 66, 68 so as to accommodate the storage of one or more small objects in the interior space defined by the storage attachment. In some instances, the length of the slot 64 is in the range of 1-2 inches.

Materials and/or dimensions different from those mentioned above can be provided for some implementations of the storage attachment 62.

The leash described above can, in some implementations, provide highly secure and reliable physical control of service dogs and other animals. In some implementations, the leash is composed of high-grade components and a robust design such that it can sustain highly physical conditions, provide high reliability, and offer in-field configurability. The leash can, in some cases, allow for hands-free connection of the dog or other animal to the handler or to objects for hitching quickly with minimal effort. Multiple dogs or other animals may be attached to the leash relatively easily. Elastic sections can provide for animal pull shock control and and/or secure elastic attachment to the handler. In some implementations, a removable storage compartment allows for low-bounce, secure, and reliable attachment of personal items and/or doggie bags.

The leash 20 can be used, for example, by Americans with Disabilities Act (ADA) service dog handlers, search and rescue dog handlers, police dog handlers, as well as health and wellness dog handlers, among others.

Various modifications will be readily apparent from the foregoing detailed description and the drawings. Accordingly, other implementations also are within the scope of the claims.

What is claimed is:

1. An animal leash comprising:
   a strap including first and second strap portions stacked one over the other, the strap having a first end and a second end, wherein the first and second strap portions are attached to one another by stitches along a width of the first and second strap portions, and the second strap portion is pinched together at points midway between adjacent pairs of the stitches;
   a first coupling link attached to the first end of the strap; and
   a second coupling link attached to the second end of the strap,
   wherein, along a middle section of the strap, the first and second strap portions form a plurality of loops, and wherein the first coupling link is operable for attachment to any one of the plurality of loops.

2. The animal leash of claim 1, wherein the first and second strap portions are attached to one another by bar tack stitches along the width of the first and second strap portions.

3. The animal leash of claim 2 wherein the second strap portion is pinched together at points midway between adjacent pairs of the bar tack stitches.

4. The animal leash of claim 3 wherein the second strap portion is pinched together at points midway between adjacent pairs of the bar tack stitches by additional bar tack stitches.

5. The animal leash of claim 1 wherein each of the first and second coupling links includes a respective carabiner, and wherein each of the carabiners is attached at a respective end of the strap between respective pairs of the stiches.

6. The animal leash of claim 5 wherein the respective pairs of stitches, between which the carabiners are attached, are positioned sufficiently close to one another to prevent significant rotation of the carabiners relative to the strap.

7. The animal leash of claim 1 wherein each of the first and second coupling links includes a respective safety closure.

8. The animal leash of claim 1 wherein each of the first and second coupling links includes a respective carabiner.

9. The animal leash of claim 1 wherein the first and second strap portions comprise nylon.

10. The animal leash of claim 9 wherein the strap further includes a stretchable elastic section adjacent the first end of the strap.

11. The animal leash of claim 1 wherein the first coupling link is attached to one of the plurality of loops along the middle section of the strap so as to form a ring.

12. The animal leash of claim 1 further including a storage compartment disposed around a section of the strap, the storage compartment having openings at opposite ends through which the strap extends, the storage compartment further having a slot for insertion or removal of an object.

13. The animal leash of claim 12 wherein the storage compartment is composed of a four-way stretch neoprene material.

14. The animal leash of claim 12 wherein the storage compartment is wider at a middle section than at the ends.

15. A dog leash comprising:
a strap including first and second strap portions attached in parallel one over the other, the strap having a first end and a second end, wherein the first and second strap portions are attached to one another by sets of stitches each of which runs along a width of the first and second strap portions, wherein different sets of the stitches are separated from one another along a length direction of the first and second strap portions so as to form a plurality of loops along the strap, and wherein the second strap portion is pinched together at points midway between adjacent sets of the stitches;
a first carabiner connected to the first end of the strap and configured for connection to any one of the loops; and
a second carabiner connected to the second end of the strap.

16. The dog leash of claim 15 wherein the sets of stitches includes bar tack stiches, and wherein the second strap portion is pinched together at points midway between adjacent sets of the bar tack stitches by additional bar tack stitches.

* * * * *